UNITED STATES PATENT OFFICE.

DANIEL VORLÄNDER AND BRUNO DRESCHER, OF HALLE-ON-THE-SAALE, GERMANY, ASSIGNORS TO BADISCHE ANILIN AND SODA FABRIK, OF LUDWIGSHAFEN, GERMANY, A CORPORATION OF GERMANY.

ACYLATED INDOXYLIC ACID AND PROCESS OF MAKING SAME.

SPECIFICATION forming part of Letters Patent No. 690,332, dated December 31, 1901.

Application filed June 4, 1901. Serial No. 63,143. (No specimens.)

*To all whom it may concern:*

Be it known that we, DANIEL VORLÄNDER, private tutor, a subject of the King of Prussia, German Emperor, and BRUNO DRESCHER, student of chemistry, a subject of the Duke of Altenburg, both residing at Halle-on-the-Saale, Germany, have invented new and useful Improvements in Acylated Indoxylic Acid and Processes of Producing Same, of which the following is a specification.

We have discovered that valuable monoacylated compounds of indoxylic acid or indoxyl can be obtained by causing a moderate reaction to take place between indoxylic acid or indoxyl or salts thereof and, on the other hand, acetic anhydrid, acetyl chlorid, benzoyl chlorid, or similar acid derivatives, all of which are hereinafter included in the expression "organic acid derivative." As indoxylic acid readily changes into indoxyl, emitting carbonic-acid gas, it usually happens that upon acylating indoxylic acid the acyl derivatives of indoxylic acid and indoxyl are obtained in one operation. According to the nature of the initial material used and from the method of working the acyl compounds of indoxylic acid or of indoxyl can be obtained as the principal or sole product.

We wish to claim in this application the hereinbefore-defined acyl derivatives of indoxylic acid and the process of producing same, while the acyl derivatives of indoxyl are claimed in the specification, Serial No. 63,142, filed June 4, 1901.

The following examples will serve to further illustrate the nature of our invention and a method of carrying it into practical effect; but our invention is not confined to the examples. The parts are by weight.

*Example 1—Production of salts of monoacet-indoxylic acid.*—Dissolve two (2) parts of a melt containing the sodium salt of indoxylic acid and caustic soda (see *Berichte*, Vol. 17, p. 976, such as can be obtained according to the data of Baeyer and Forrer) in four (4) parts of water. Keep the mixture cool while dissolving and nearly neutralize the excess of alkali by the addition of one (1) to one and a half (1½) parts of glacial acetic acid or the corresponding quantity of weaker acetic acid. Add to the still alkaline solution while keeping it cold with ice and in an atmosphere free from oxygen one (1) part of acetic anhydrid. This is added in small portions at a time, and the mixture is thoroughly mixed until the solution has an acid reaction. The sodium salt of the acet-indoxylic acid separates out in the crystalline form during the operation. Collect the salt and purify it by redissolving in a little cold water containing acetic acid, filter the solution to separate any indigo or acet-indoxyl, and then add sufficient sodium acetate to precipitate the acet-indoxyl from the solution. The desired sodium salt crystallizes out, giving white crystals. Upon drying the crystals assume a gray-bluish shade; but otherwise the salt does not appear to change upon exposure to the air and to light. The potassium salt of monoacet-indoxylic acid can be obtained in an analogous manner.

Instead of acetylating with acetic anhydrid, as described in the foregoing example, acetyl chlorid can be used and the alkali in the initial material can be neutralized with another acid—for instance, sulfuric or hydrochloric acid instead of with acetic acid—but if a weak acid, such as acetic acid or phosphoric acid, be used it does not matter whether the indoxylic-acid salt is dissolved in the excess of alkali, as described, or in the solution of a salt of one of the said weak acids, which solution may possess an acid, neutral, or alkaline reaction. The acetylation proceeds most satisfactorily when the salt solution is concentrated, because the presence of the salts hinders the decomposition of the acetic anhydrid or acetyl chlorid by water or alkali, so that it remains available for the acetylation. The acetylation can also be effected in the absence of water by treating the powdered mixture of alkali and indoxylic-acid salt with a solution of acetic anhydrid or acetyl chlorid in benzene, or, again, indoxylic acid can be acetylated by treatment in the dry state with acetic anhydrid. The reaction proceeds slowly at the ordinary temperature, occupying about ten (10) days. At a temperature of about thirty (30°) to forty (40°) degrees centigrade it is usually completed in about twelve (12) hours. In this way the free acet-indoxylic acid is obtained. It can be converted into the alkali salt by dissolving in a carbonate or caustic alkaline solution. The free monoacet-indoxylic acid, on the other hand, can be obtained from the aqueous solution of its alkali salts by the addition of hydrochloric acid, which precipitates it. It can be purified by recrystallization from water. Its alcoholic solution becomes dark red on the addition of ferric chlorid.

The alkaline solution of monoacet-indoxylic acid is colorless in the absence of air. Upon exposure to the air it turns green, and within a short time indigo forms. The other acyl-indoxylic acids, such as propionyl or benzoyl indoxylic acid, possess similar properties.

*Example 2—Production of a mixture of monoacet-indoxyl and monoacet-indoxylic acid.—* Prepare a melt containing indoxyl and indoxylic acid obtained, say, from one (1) part of phenyl-glycocol-ortho-carboxylic acid (alkali salt) and three (3) parts of potassium hydroxid in the manner described in the specification of Letters Patent No. 546,165. Dissolve five (5) parts of such a melt in an equal quantity of water and neutralize the excess of potash with concentrated acetic acid and then add one (1) part of acetic anhydrid and agitate the mixture. A crystalline precipitate consisting of acet-indoxyl and acet-indoxylic acid (potassium salt) separates out. To separate these compounds, grind the precipitate repeatedly with ice-cold water. The acet-indoxyl remains undissolved. The monoacet-indoxyl thus obtained and which we wish to claim specifically can be recrystallized from water containing a little alcohol and is obtained in leaflets. It melts at a temperature of one hundred and twenty-five (125°) to one hundred and twenty-six (126°) degrees centigrade. It, as also the other monoacyl indoxyl bodies, such as propionyl-indoxyl and benzoyl-indoxyl, are readily soluble in alcohol, ether, glacial acetic acid, benzene, and chloroform. They are not dissolved by cold caustic-alkali solution, but upon standing with caustic alkali, or carbonate of soda solution they are decomposed. The alcoholic solutions do not give a color reaction with ferric chlorid. If their glacial acetic-acid solutions be warmed with a little concentrated nitric acid or with bromin water, a violet-red color is obtained. On heating with caustic soda and subsequent treatment with air they yield indigo. The potassium salt of the acet-indoxyl acid contained in the filtrate from the acet-indoxyl can be collected by salting out.

Now, what we claim is—

1. The process of producing mono-acyl indoxylic acid and its salts which consists in causing a moderate reaction to take place between indoxylic acid and a hereinbefore-defined organic acid derivative, substantially as described.

2. The process of producing monoacet-indoxylic acid and its salts which consists in causing a moderate reaction to take place between indoxylic acid and acetic anhydrid, substantially as described.

3. As a new body mono-acyl indoxylic acid which can be obtained substantially as described; which is soluble in alcohol and ether; whose sodium salt is precipitated from its sufficiently-concentrated aqueous solution by sodium acetate; whose alcoholic solution gives a red coloration on the addition of ferric chlorid; and which when heated with caustic soda and subsequently treated with air yields indigo, substantially as described.

4. As a new body monoacet-indoxylic acid which can be obtained substantially as described; which is soluble in alcohol and ether; whose sodium salt is precipitated from its sufficiently-concentrated aqueous solution by sodium acetate; whose alcoholic solution gives a red coloration on the addition of ferric chlorid; and which when heated with caustic soda and subsequently treated with air yields indigo, substantially as described.

In testimony whereof we have hereunto set our hands in the presence of two subscribing witnesses.

DANIEL VORLÄNDER.
BRUNO DRESCHER.

Witnesses:
RUDOLPH FRICKE,
B. H. WARNER, Jr.